(12) United States Patent
Huff et al.

(10) Patent No.: US 12,036,735 B2
(45) Date of Patent: Jul. 16, 2024

(54) 3D PRINTED VEHICLE ARCHITECTURE, JOINTS AND METHOD

(71) Applicant: Ford Global Technologies, LLC, Dearborn, MI (US)

(72) Inventors: Garret Huff, Ann Arbor, MI (US); Michael James Whitens, Northville, MI (US); Peter A. Friedman, Ann Arbor, MI (US); Cynthia Mowery Flanigan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/076,880

(22) Filed: Dec. 7, 2022

(65) Prior Publication Data

US 2023/0118066 A1 Apr. 20, 2023

Related U.S. Application Data

(63) Continuation of application No. 16/490,659, filed as application No. PCT/US2018/020349 on Mar. 1, 2018, now Pat. No. 11,623,390.

(60) Provisional application No. 62/465,628, filed on Mar. 1, 2017.

(51) Int. Cl.
*B29C 64/176* (2017.01)
*B33Y 10/00* (2015.01)
*B33Y 40/20* (2020.01)
*B62D 27/02* (2006.01)
*F16B 11/00* (2006.01)

(52) U.S. Cl.
CPC ............ *B29C 64/176* (2017.08); *B33Y 10/00* (2014.12); *B33Y 40/20* (2020.01); *B62D 27/02* (2013.01); *F16B 11/008* (2013.01)

(58) Field of Classification Search
CPC ..... F16B 11/006; B62D 27/023; E04B 1/1909
See application file for complete search history.

(56) References Cited

U.S. PATENT DOCUMENTS

| | | | | |
|---|---|---|---|---|
| 5,385,050 A | * | 1/1995 | Roberts | G01B 17/00 33/783 |
| 7,322,106 B2 | * | 1/2008 | Marando | B22D 19/045 29/897 |
| 7,517,425 B2 | * | 4/2009 | Schroeder | B62D 21/08 403/361 |
| 8,094,921 B2 | * | 1/2012 | Engelbart | G06T 11/00 382/141 |

(Continued)

FOREIGN PATENT DOCUMENTS

| | | | | |
|---|---|---|---|---|
| DE | 102013011421 A1 | * | 4/2014 | ............ F16B 11/006 |
| WO | WO-2017168131 A1 | * | 10/2017 | ............ B62K 19/04 |

OTHER PUBLICATIONS

DE-102013011421-A1 translation (Year: 2014).*

*Primary Examiner* — Michael W Hotchkiss
(74) *Attorney, Agent, or Firm* — Burris Law, PLLC

(57) ABSTRACT

A method of assembling components of a vehicle is provided that includes locating a node relative to an adjoining component, measuring at least one geometrical feature of the node or the adjoining component, 3D printing an assembly adjustment member based on the measuring, and placing the assembly adjustment member proximate at least one of the node or the adjoining component. The assembly adjustment member is configured to allow relative movement between the node and the adjoining component for subsequent processing operations.

20 Claims, 7 Drawing Sheets

(56) References Cited

U.S. PATENT DOCUMENTS

| | | | | |
|---|---|---|---|---|
| 8,756,792 B2* | 6/2014 | Boyl-Davis | | G06F 30/15 |
| | | | | 403/135 |
| 8,813,382 B1* | 8/2014 | Buttrick | | G01B 7/14 |
| | | | | 33/563 |
| 10,183,706 B2* | 1/2019 | Miller | | E04B 1/1909 |
| 10,227,145 B2* | 3/2019 | Hijmans | | B64G 99/00 |
| 10,286,961 B2* | 5/2019 | Hillebrecht | | B22F 10/25 |
| 10,315,369 B2* | 6/2019 | Sutter | | B05B 13/0618 |
| 10,781,840 B2* | 9/2020 | Sikorski | | B29C 66/612 |
| 10,935,062 B2* | 3/2021 | Sutter | | F16B 7/048 |
| 10,960,929 B2* | 3/2021 | Czinger | | B62D 21/17 |
| 2002/0050064 A1* | 5/2002 | Furuse | | B62D 29/008 |
| | | | | 29/897.2 |
| 2003/0102668 A1* | 6/2003 | Tarbutton | | B21D 39/04 |
| | | | | 156/305 |
| 2007/0246972 A1* | 10/2007 | Favaretto | | B62D 23/005 |
| | | | | 296/205 |
| 2008/0110275 A1* | 5/2008 | Odendahl | | G01B 7/14 |
| | | | | 73/780 |
| 2011/0158741 A1* | 6/2011 | Knaebel | | B62D 27/026 |
| | | | | 156/293 |
| 2012/0316666 A1* | 12/2012 | Boyl-Davis | | G05B 19/40931 |
| | | | | 700/98 |
| 2014/0241790 A1* | 8/2014 | Woleader | | B29C 66/342 |
| | | | | 156/305 |
| 2015/0052025 A1* | 2/2015 | Apsley | | G06Q 10/0836 |
| | | | | 705/26.81 |
| 2016/0016229 A1* | 1/2016 | Czinger | | B62D 23/005 |
| | | | | 296/205 |
| 2016/0297479 A1* | 10/2016 | Ritschel | | B62D 27/023 |
| 2017/0001368 A1* | 1/2017 | Czinger | | B29C 66/612 |
| 2017/0050677 A1* | 2/2017 | Czinger | | B62D 29/048 |
| 2017/0057558 A1* | 3/2017 | Hillebrecht | | B62D 29/008 |
| 2018/0067476 A1* | 3/2018 | Engelbart | | G06F 30/17 |
| 2018/0086386 A1* | 3/2018 | Pastrick | | B62D 23/005 |
| 2018/0319151 A1* | 11/2018 | Deane | | F16L 27/11 |

* cited by examiner

3D PRINTED VEHICLE ARCHITECTURE, JOINTS AND METHOD

CROSS-REFERENCE TO RELATED APPLICATIONS

This application is a continuation of U.S. patent application Ser. No. 16/490,659 filed Sep. 3, 2019, which is a National Phase of International Application No. PCT/US2018/020349 filed Mar. 1, 2018, which claims priority to and the benefit of U.S. Provisional Application No. 62/465,628 filed Mar. 1, 2017. The disclosures of the above applications are incorporated herein by reference.

FIELD

The present disclosure relates to the assembly of motor vehicles, and more particularly to the use of 3D printing, or additive manufacturing, in the fabrication and assembly of motor vehicles.

BACKGROUND

The statements in this section merely provide background information related to the present disclosure and may not constitute prior art.

There are many conflicting pressures for automotive manufacturers to build safer, yet lighter and more efficient vehicles. New technologies are constantly being developed in an effort to reduce vehicle mass through a variety of means such as raw materials, processing methods, and their integration into vehicle structures. These new technologies enable more efficiently designed and manufactured structures that are able to meet structural performance requirements, while still reducing vehicle mass and therefore improving fuel economy.

One area of advancement is the proliferation of 3D additive manufacturing of metals and plastics, as well as quality management through 3D scanning systems. The management of build quality is important because larger and stiffer components, such as cast or printed nodes and long extrusions, may not meet part fit up requirements in the body structure. Gaps between mating parts can render certain joining methods unfeasible and also build residual stresses into the structure. Thus, when all components and their tolerances are paired and optimized to be used together, overall dimensional and manufacturing robustness of the vehicle is improved.

SUMMARY

A method of assembly includes locating a node relative to an adjoining component, measuring at least one geometrical feature of the node or the adjoining component, identifying a gap between the node and the adjoining component based on the measuring, 3D printing an assembly adjustment member according to the gap based on the measuring, the assembly adjustment member being physically separate from the node, and placing the assembly adjustment member proximate at least one of the node or the adjoining component to fill the gap. The assembly adjustment member is configured to allow relative movement between the node and the adjoining component for subsequent processing operations.

In variations of the method, which may be implemented individually or in combination: the 3D printing is performed in-situ with the method of assembling; the 3D printing is performed offline and the assembly adjustment member is prefabricated; the assembly adjustment member is selected from a library of standard assembly adjustment members; the assembly adjustment member is disposed between the node and the adjoining component; at least one of the node and the adjoining component are formed by a 3D printing process; the adjoining component defines an insert that is disposed at least partially within a hollow space of the node; the hollow space of the node is at least partially filled with an adhesive after the subsequent processing operations; the adhesive is injected into the hollow space of the node through an injection port; mechanically securing the adjoining component within the node after the subsequent processing operations; the node further includes a tapered outer geometry configured to provide additional relative movement between the node and the adjoining component; the subsequent processing operations are selected from the group consisting of an electrophoretic coating (E-Coat) process, painting, and surface coating processes; a plurality of nodes and a plurality of adjoining components are measured, and the 3D printed assembly adjustment members are paired with closest mating geometries of nodes and adjoining components; the node is an organic node that is optimized for design load conditions and is formed by a 3D printing process, the node defining at least one receiving portion and an outer geometry that is configured elastically, and up to plastically, deform for fit-up of the node to the adjoining component.

In another form, a method of assembly includes locating a node relative to an adjoining component, measuring at least one geometrical feature of the node or the adjoining component to determine a deviation from a nominal geometry of the node and the adjoining component, 3D printing an assembly adjustment member to correct for the deviation based on the measuring, the assembly adjustment member being physically separate from the node, and placing the assembly adjustment member proximate at least one of the node or the adjoining component.

In variations of the method, which may be implemented individually or in combination: identifying interfacing geometries of the node and the adjoining component and determining the deviation as a gap between the interfacing geometries; placing the assembly adjustment member further includes inserting the assembly adjustment member between the node and the adjoining component to secure the node to the adjoining component; wherein the assembly adjustment member is a shim.

In another form, a method of assembly includes placing a node adjacent to an adjoining component, measuring at least one geometrical feature of the node or the adjoining component to determine a deviation from a nominal geometry of an interface between the node and the adjoining component, 3D printing an assembly adjustment member to correct for the deviation based on the measuring, the assembly adjustment member being physically separate from the node, and placing the assembly adjustment member at the interface to connect the node and the adjoining component. The assembly adjustment member is configured to allow relative movement between the node and the adjoining component for subsequent processing operations.

In variations of the method, the 3D printing is performed in-situ with the method of assembling.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 5A:
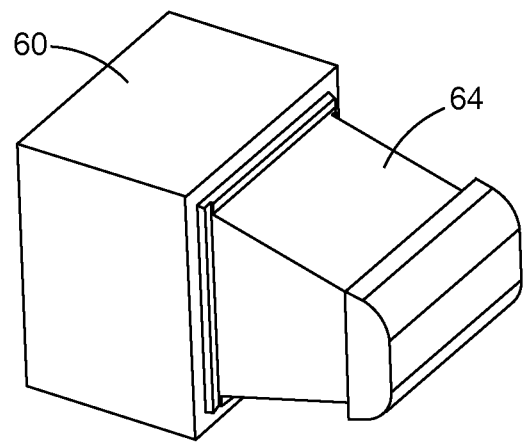
FIG. 5A is a perspective view of a node having a tapered extension and constructed according to the teachings of the present disclosure.
Figure 6:
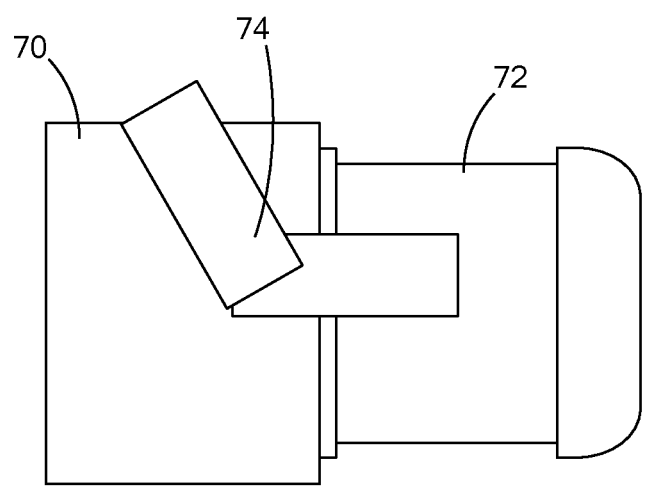
Figure 7:
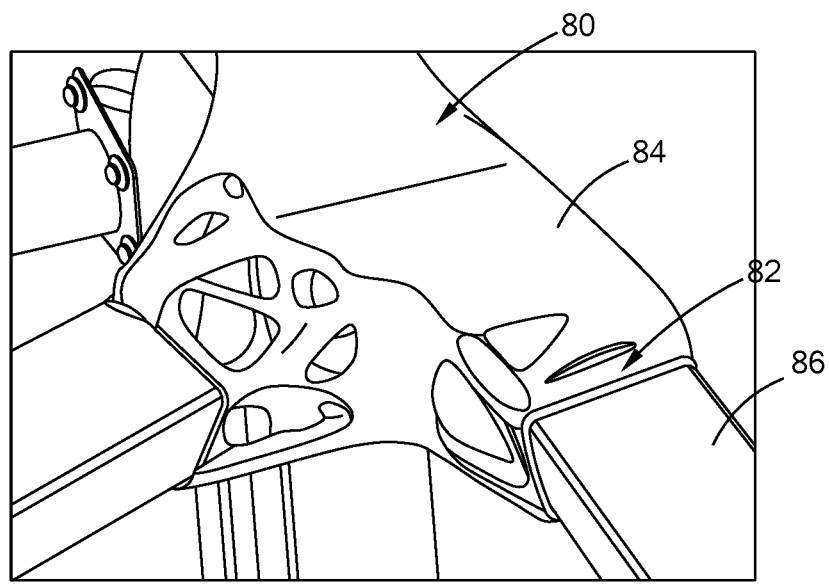

FIB. 5B is a side view of the node of FIG. 5A having a shim and constructed according to the teachings of the present disclosure;

FIG. 6 is a side schematic view of a node having an adhesive injection port constructed according to the teachings of the present disclosure; and FIG. 7 is a perspective view of an organic node constructed in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As used herein, the term "3D printing" or "3D printed" should be construed to be the same as "additive manufacturing," or a process that forms a component part through the accumulation of a material or particles. Such processes may include, by way of example, stereolithography, metal sintering, and photo-polymerization, among others, which are included within the broad categories of material extrusion, material jetting, binder jetting, sheet lamination, vat photo polymerization, powder bed fusion, and direct energy deposition. Such processes should be construed as being within the scope of the present disclosure.

Figure 1A:
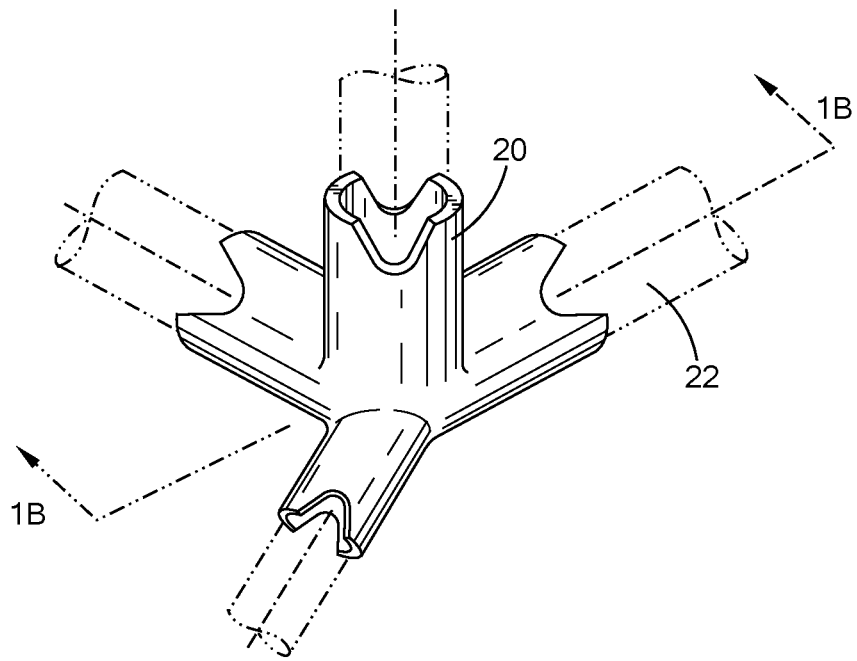
FIG. 1A is a perspective view of a node and mating components constructed according to the teachings of the present disclosure.
Figure 1B:
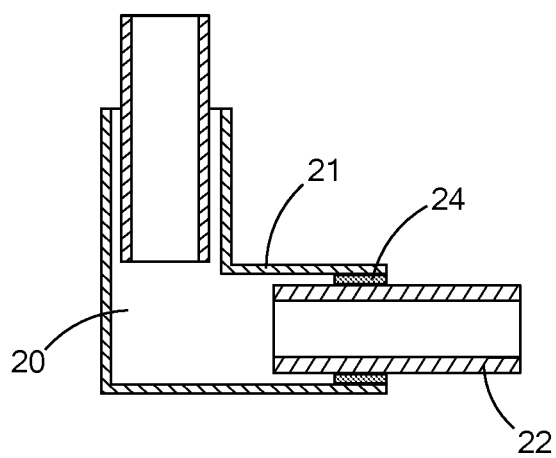
FIG. 1B is a cross-sectional view, taken along line 1B-1B of FIG. 1A, of the node and mating components.

Referring to FIGS. 1A and 1B, a "just-in-time" (JIT) 3D printed node mating surface is illustrated and described in greater detail. In this form, a vehicle assembly includes at least one node 20, at least one component 22 fitted to the node 20, and a custom 3D printed interface member 24, also referred to more generically herein as an "assembly adjustment member," disposed between at least one surface of the node and at least one mating surface of the component, wherein the custom 3D printed interface member 24 comprises a geometry defined by physical measurements of the node 20 and the component 22. The interfacing geometries of the node 20 and the component 22, such as the I.D. of the node extension 21 and the O.D. of mating component 22 are measured using technologies such as a CMM (coordinate measurement machine), laser geometric measuring systems, and/or photographic measurement systems, among others. CAD models of these actual geometric interfaces are then generated to create a model for the interface member 24, which can be rapidly fabricated using a 3D printing technique. The interface member 24 is thus custom sized for the specific, individual interface and allows the component 22 to move inside the node 20, through certain thermal processing, such as coating or painting. Adhesive and/or mechanical joints can be applied/cured in the assembly before or after such thermal processing to provide a structural connection.

As used herein, the term "node" should be construed to mean a part or member that is used to join one or more mating components, which may be at one or several locations of the node. Examples of nodes can be found in U.S. Published Application No. 20170001368 and its related family of applications, which are incorporated herein by reference in their entirety.

Figure 2:
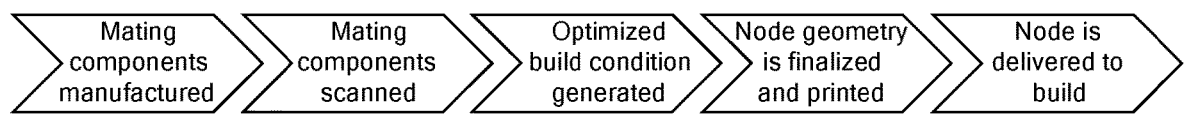
FIG. 2 is a flow diagram illustrating a method according to the teachings of the present disclosure.

Generally, basic node geometry is defined by the packaging requirements for the vehicle, and 3D scanned mating components are digitized and gaps are optimized for fit up. A trend-fit for mating components can also be actively managed through the mating node surface. A 3D printed surface that fills the gap is printed and delivered for build. Accordingly, a method of assembling a vehicle architecture as shown in FIG. 2 comprises fabricating at least one node, fabricating at least one component configured to fit-up to the node, scanning geometric features of the node and the component, fabricating a custom interface member based on the scanned geometric features using a 3D printing process, delivering the custom interface member to a build location, and inserting the interface member between the node and the component to secure the node to the component.

Figure 3:
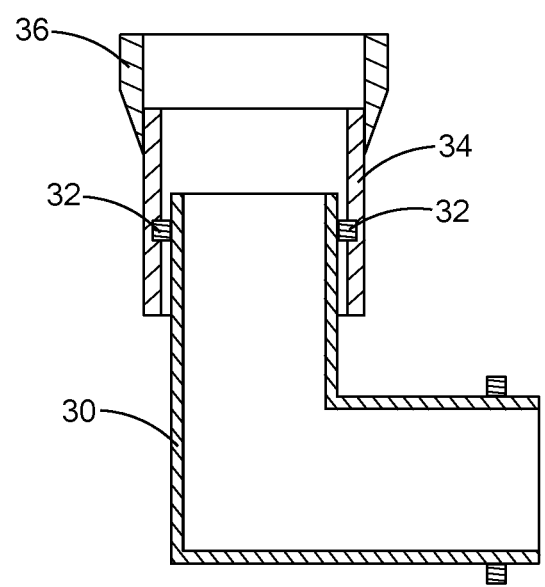
FIG. 3 is a side cross-sectional view of a node having a fixturing/tooling feature and a component blank according to the teachings of the present disclosure.

Referring to FIG. 3, a jigging (tooling/locating) geometry is provided for components that are customized by 3D printing. Generally, a method of assembling a component to a node is provided that comprises fabricating a node 30 with fixturing/tooling features 32, placing a component blank 34 onto the node 30 and locating the component blank via the fixturing/tooling features 32, and then 3D printing additional material 36 onto the component blank to form a final component geometry. In this form, the additional material 36 is an "assembly adjustment member" that allows relative movement between the node 30 and an adjoining component (not shown in FIG. 3) for subsequent processing operations.

Generally, 3D printed material is compatible with a component made from 3D printing/casting/sheet metal, fixture points are located on the body of the node, and the points allow the component to be oriented to allow final additive manufacturing on the part. A robotic arm or similar moving device move and index the part through an additive manufacturing process. The part can be oriented normal to the build plane and sintering mechanism.

Figure 4A:
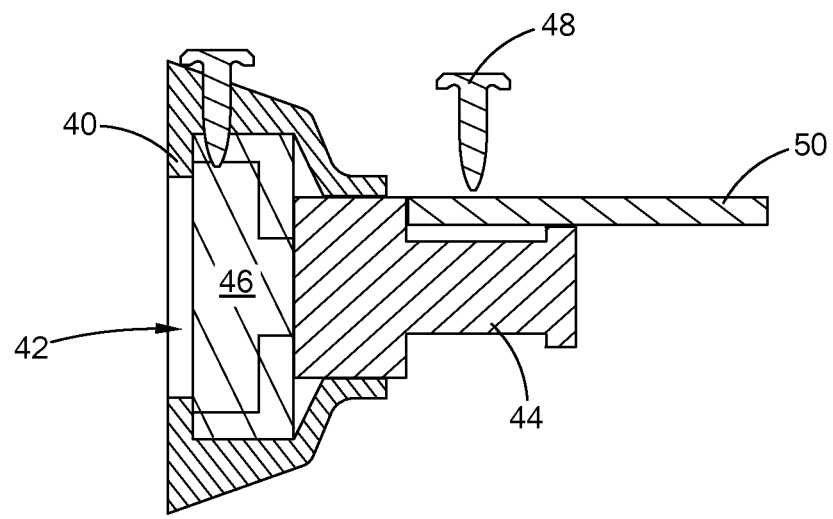
FIG. 4A is a side cross-sectional view of a node having a slip-plane constructed according to the teachings of the present disclosure.
Figure 4B:
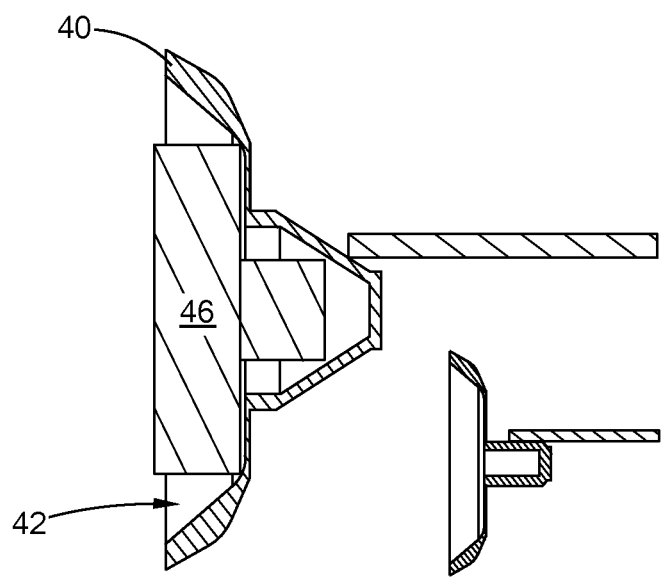
FIG. 4B is a side cross-sectional view of another form of a node having a slip-plane constructed according to the teachings of the present disclosure.

Referring now to FIGS. 4A and 4B, another form of the present disclosure with nodes having integrated slip-planes are illustrated and described in greater detail. As shown, the slip-plane may be internal to the part geometry, and mechanical joints are able to secure mating components and node relative to the joint. The joints can be made in a body shop, a paint shop, or a trim and final facility. Further, the adhesive can join a node internally and improve the stiffness of the part. The insert can also be secured by subsequently mechanically joining the slip joint to the node.

Accordingly, a node assembly for use in a vehicle architecture is provided that comprises a primary node 40 defining an internal cavity 42 and a node insert 44 disposed within the internal cavity and extending outside the primary node, the node insert 44 defining an area configured to mate with a component. An optional adhesive material 46 fills at least a portion of the internal cavity 42, and at least one mechanical member 48 or adhesive is adapted to secure the component 50 to the node insert 44. The node insert 44 is adapted to translate within the primary node 40 during thermal processing and the optional adhesive material 46 provides additional stiffness to the primary node 40, and at least one of the primary node 40 and the node insert 44 are fabricated using a 3D printing process.

In FIG. 4B, a flexure joint shaft is shown, in which a node assembly for use in a vehicle architecture is provided that comprises a node defining an internal cavity and an extension and an optional adhesive material filling at least a portion of the internal cavity. The extension of the primary node may be adapted to be plastically deformed during mating of an adjacent component, and wherein the node is fabricated using a 3D printing process. The mating component and node may again be joined via a mechanical fastener and/or adhesive.

Figure 5B:
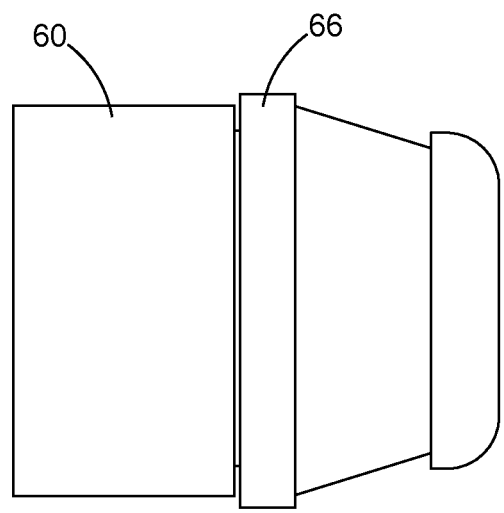

Referring now to FIGS. 5A and 5B, a node assembly for use in a vehicle assembly is provided that comprises a node 60 defining a shoulder 62 and an extension 64 extending from the shoulder 62, and a shim 66 extending around the shoulder 62 of the node 60. The node 60 is fabricated using a 3D printing process and the shim 66 is selected from a library of sizes to accommodate for vehicle assembly tolerances. The shim library may also be used to enable multiple body styles on a single platform, or in other words, join different mating geometries to a common node geometry. Similarly, the shim is also an "assembly adjustment member" that allows relative movement between the node 30 and an adjoining component (not shown in FIGS. 5A-5B) for subsequent processing operations.

Generally, a tapered or non-tapered surface can be made to increase bond area or variants of a tapering square, rectangle or circle, as is required by the mating component. The shim can be of any material metallic or polymeric. The shim "library" would allow the range of part tolerances to be used in the vehicle effectively. The shim may have elastic properties, which would allow parts with differing coefficients of thermal expansion to be used effectively in the joint. The shim material and geometry may also effectively reduce the number of shim variants required to generate an acceptable build condition.

Referring to FIG. 6, yet another node is provided, which has an adhesive injection port that is accessible in a paint shop and/or a trim and final facility. The node 70 defines a recess 72 configured to be located adjacent a component (not shown) to be assembled to the node 70, wherein the node 70 defines an internal passageway 74 in fluid communication with the recess 72, the internal passageway 74 adapted to receive and carry an adhesive material to the recess 72 to join the node 70 to the component.

In another form, a tapered or non-tapered node (e.g., similar to that shown in FIG. 5A, but without the "nose") is provided that aligns components carrying an expandable adhesive to join the components. In one form, the node defines a recess configured to be located adjacent a component to be assembled to the node, wherein the component includes an expandable adhesive and the recess is tapered to accommodate the expandable adhesive during assembly, and the node is fabricated using a 3D printing process.

In still another form, a method of assembling a vehicle is provided that comprises scanning critical geometries of mating components from a plurality of mating components, comparing the scanned critical geometries of the mating components with virtual build software, pairing mating components having the closest mating geometries from the plurality of mating components, and assembling the paired mating components.

Referring to FIG. 7, an "organic" node is provided that defines a geometry optimized for design load conditions and being formed by a 3D printing process, the node 80 defining at least one receiving portion 82 and an outer geometry 84 that is designed to elastically, and up to plastically, deform for fit-up of the node 80 to an adjacent component 86. Such geometries would be nearly impossible or cost prohibitive with traditional processes such as machining or casting, and thus 3D printing enables these complex yet structurally efficient geometries, which can be elastically, and up to plastically, deformable for an improved assembly fit.

The various forms illustrated and described herein are variations of how a complex node geometry can be mated to a simple tube without gaps present. Additionally, the present disclosure provides solutions to construct a mixed-material (i.e. carbon fiber composite tube to aluminum node) vehicle that would be painted in a conventional paint shop. In the past, space frame construction required qualification of all aluminum extrusions, which is a timely and expensive process. By scanning and measuring all incoming components, an optimized set of components can be used for each vehicle, assuming the quantities are sufficiently high. However, for a low-volume process, it may be beneficial to customize each node rather than match a set of tubes. Therefore, an improved design includes a master node location and a defined mating node. The mating node may be produced "just-in-time" in a low-volume process, or a library of shims could be used to glove over the node and offer the same high-quality build.

When the vehicle structure is subjected to the paint ovens, the various materials that may be present will expand and contract different amounts due to their different coefficients of thermal expansion. Therefore, to improve the post-paint dimensional stability of the body-in-white, it may be beneficial to make the final mixed-material connections after the body structure would see its most stringent thermal cycling. As such, adhesive injection ports that are accessible in trim and final for example would allow joints to slip past one another during thermal events, and then fixed and cured during the in-service temperature range. At a minimum, specification of an adhesive and its bond gap that is able to withstand the stress associated with the paint shop thermal cycle would be provided.

The description of the disclosure is merely exemplary in nature and, thus, variations that do not depart from the substance of the disclosure are intended to be within the scope of the disclosure. For example, in some forms, the components are configured to be inserted inside a node, or outside a node, and it should be understood that any combination of these configurations, among others, may be employed while remaining within the scope of the present disclosure, provided that the configuration is adapted to provide for an improved assembly fit between a node and a mating component. Such variations are not to be regarded as a departure from the spirit and scope of the disclosure.

What is claimed is:

1. A method of assembly comprising:
locating a node relative to an adjoining component;
measuring at least one geometrical feature of the node or the adjoining component;

identifying a gap between the node and the adjoining component based on the measuring;

3D printing an assembly adjustment member according to the gap based on the measuring, the assembly adjustment member being physically separate from the node; and placing the assembly adjustment member proximate at least one of the node or the adjoining component to fill the gap, wherein the assembly adjustment member is configured to allow relative movement between the node and the adjoining component for subsequent processing operations, wherein a plurality of nodes and a plurality of adjoining components are measured, and a plurality of 3D printed assembly adjustment members are paired with closest mating geometries of nodes and adjoining components.

2. The method of claim 1, wherein the 3D printing is performed in-situ with the method of assembling.

3. The method of claim 1, wherein at least one of the plurality of assembly adjustment members is disposed between at least one of the plurality of nodes and at least one of the plurality of adjoining components.

4. The method of claim 1, wherein at least one of the plurality of nodes and the plurality of adjoining components are formed by a 3D printing process.

5. The method of claim 1, wherein at least one of the plurality of nodes further comprises a tapered outer geometry configured to provide additional relative movement between the at least one node and at least one of the plurality of adjoining components.

6. The method of claim 1, wherein the subsequent processing operations are selected from the group consisting of an electrophoretic coating (E-Coat) process, painting, and surface coating processes.

7. The method of claim 1, wherein the 3D printing is performed offline and at least one of the plurality of assembly adjustment members is prefabricated.

8. The method of claim 7, wherein at least one of the plurality of assembly adjustment members is selected from a library of standard assembly adjustment members.

9. The method of claim 1, wherein at least one of the plurality of adjoining components defines an insert that is disposed at least partially within a hollow space of at least one of the plurality of nodes.

10. The method of claim 9, further comprising mechanically securing the adjoining component within the at least one node after the subsequent processing operations.

11. The method of claim 9, wherein the hollow space of the at least one node is at least partially filled with an adhesive after the subsequent processing operations.

12. The method of claim 11, wherein the adhesive is injected into the hollow space of the at least one node through an injection port.

13. A method of assembly comprising:

locating a node relative to an adjoining component;

measuring at least one geometrical feature of the node or the adjoining component;

identifying a gap between the node and the adjoining component based on the measuring;

3D printing an assembly adjustment member according to the gap based on the measuring, the assembly adjustment member being physically separate from the node; and placing the assembly adjustment member proximate at least one of the node or the adjoining component to fill the gap, wherein the assembly adjustment member is configured to allow relative movement between the node and the adjoining component for subsequent processing operations, and wherein the node is an organic node that is optimized for design load conditions and is formed by a 3D printing process, the node defining at least one receiving portion and an outer geometry that is configured elastically, and up to plastically, deform for fit-up of the node to the adjoining component.

14. The method of claim 13, wherein the 3D printing of the assembly adjustment member is performed in-situ with the method of assembling.

15. The method of claim 13, wherein the assembly adjustment member is disposed between the node and the adjoining component.

16. The method of claim 13, wherein the adjoining component defines an insert that is disposed at least partially within a hollow space of the node.

17. The method of claim 13, further comprising mechanically securing the adjoining component within the node after the subsequent processing operations.

18. The method of claim 13, wherein the node further comprises a tapered outer geometry configured to provide additional relative movement between the node and the adjoining component.

19. The method of claim 13, wherein placing the assembly adjustment member further comprises inserting the assembly adjustment member between the node and the adjoining component to secure the node to the adjoining component.

20. The method of claim 13, wherein the assembly adjustment member is a shim.

* * * * *